July 6, 1965
V. E. SWINDLER
3,193,159
DISPENSER FOR COMMINUTED MATERIAL AND THE LIKE
Filed Feb. 24, 1964
2 Sheets-Sheet 1
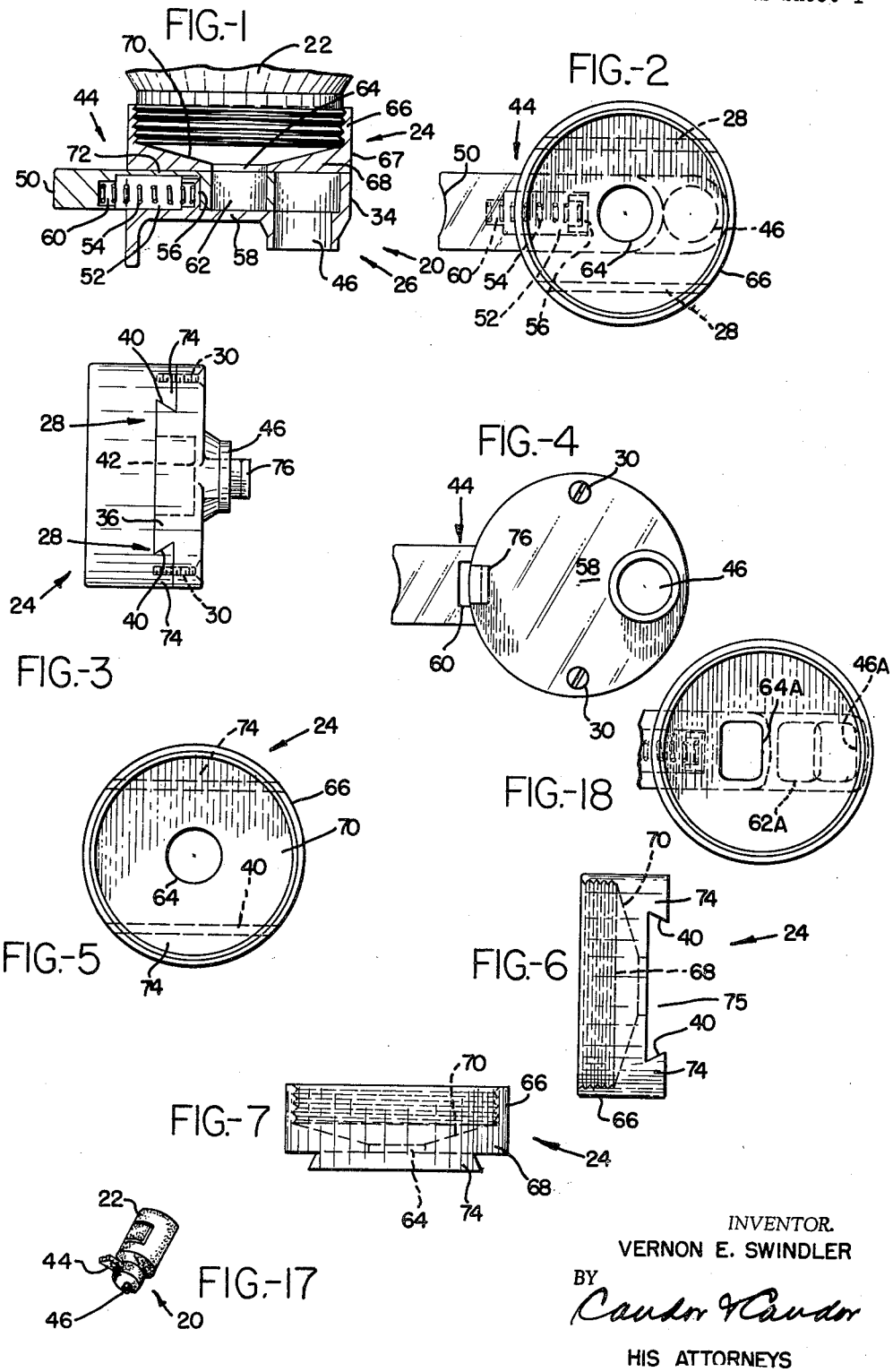
INVENTOR.
VERNON E. SWINDLER
BY
Cauder & Cauder
HIS ATTORNEYS

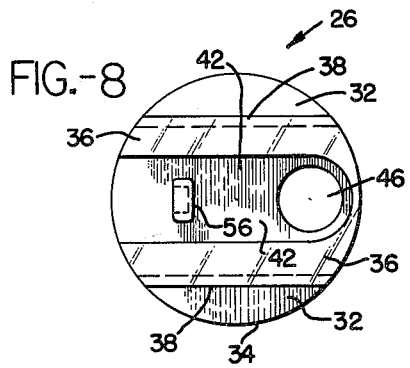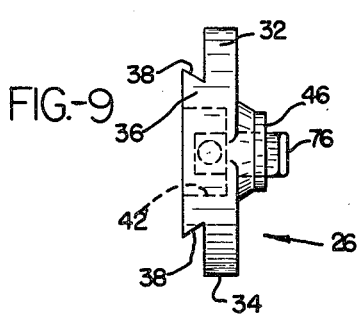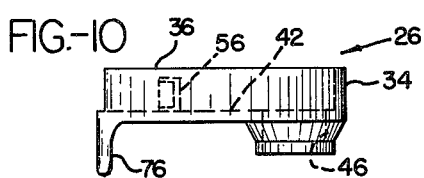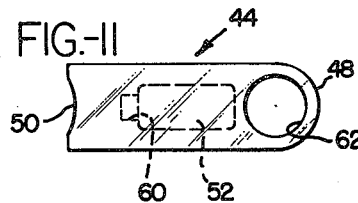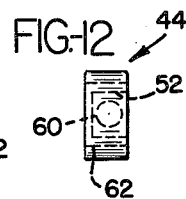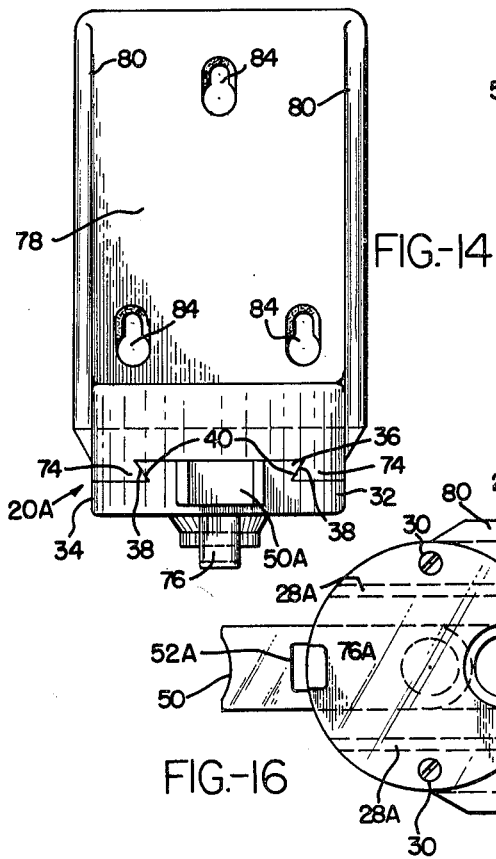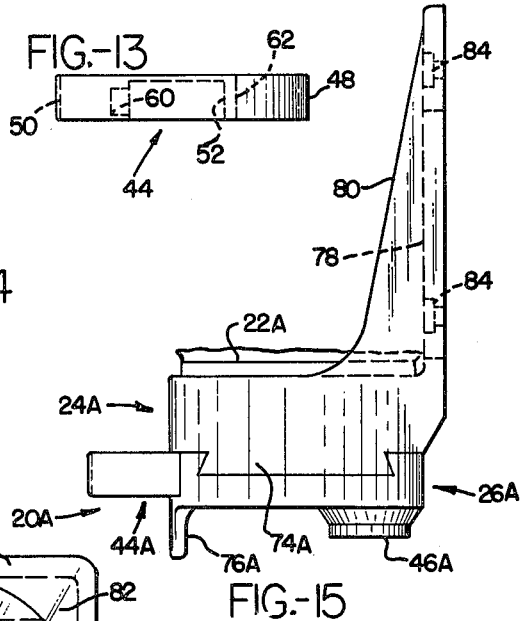

United States Patent Office 3,193,159
Patented July 6, 1965

3,193,159
DISPENSER FOR COMMINUTED MATERIAL
AND THE LIKE
Vernon E. Swindler, Preble County, Ohio
(R.R. 1, Box 133, West Alexandria, Ohio)
Filed Feb. 24, 1964, Ser. No. 346,845
8 Claims. (Cl. 222—336)

This invention relates to a dispenser for comminuted material and the like.

One of the features of this invention is the provision of a dispenser unit for comminuted material which can be readily attached to a supply container, such as a bottle and the like, to dispense the comminuted material from such container or bottle.

Another feature of this invention is to provide a dispensing unit of the character described above which can be attached to an upwardly directed open end of said supply container which then can be inverted without the discharge of comminuted material unless a reciprocable plunger is reciprocated to cause such unit to dispense one or more measured quantities of comminuted material from said container.

Another feature of this invention is the provision of a dispenser unit of the character described above which has a supply container receiving wall connected to a comminuted material supply outlet in said unit which connects the supply container to a comminuted material supply outlet in said unit, said unit also having a comminuted material dispensing spout for dispensing measured comminuted material to a receiving receptacle, said unit also having an outwardly biased plunger reciprocable between an outward position and an inward position to cause transfer of measured quantities of comminuted material from said outlet in said unit to said dispensing spout.

Another feature of this invention includes a dispensing unit of the above character which has an upper member and a lower member, such members being secured together by a dovetailing action.

Another feature of this invention includes a dispensing unit of the general character above described which can be removably attached to a supporting wall so that the unit can be removed from such supporting wall, be inverted and secured to an upwardly directed open end of the supply container, thereafter the dispensing unit and attached supply container being returnable for support on said supporting wall for dispensing measured quantities of comminuted material from such wall supported position.

This invention may be used to dispense various types of comminuted material, such as "instant" coffee, powdered material and the like, with such material being dispensed directly from the opened mouth of the original bottle and the like in which the material is sold at retail.

Other features are apparent from this description, the appended claimed subject matter and/or the accompanying drawings in which:

FIGURE 1 is a vertical cross section of the dispenser to be attached to the threaded bottle opening.
FIGURE 2 is a top plan view of FIGURE 1.
FIGURE 3 is a side view of FIGURE 2.
FIGURE 4 is a bottom view of FIGURE 1.
FIGURE 5 is a top view of upper bottle receiving member of FIGURE 1.
FIGURE 6 is a side view of FIGURE 5.
FIGURE 7 is a side view of FIGURE 5 at a right angle to FIGURE 6.
FIGURE 8 is a top view of the bottom member of FIGURE 1.
FIGURE 9 is a side view of FIGURE 8.
FIGURE 10 is a side view of FIGURE 8 at a right angle to FIGURE 9.
FIGURE 11 is a top view of the plunger of FIGURE 1.
FIGURE 12 is a side view of FIGURE 11.
FIGURE 13 is a side view of FIGURE 11 at a right angle to FIGURE 12.
FIGURE 14 is a front view of the wall type of dispenser.
FIGURE 15 is a side view of FIGURE 14.
FIGURE 16 is a bottom view of FIGURE 15.
FIGURE 17 is a view in reduced scale showing the bottle and dispenser assembled together.
FIGURE 18 is a view somewhat similar to FIGURE 2 showing another embodiment of the discharge opening constructions.

Certain words, indicating direction, relative position etc., are used herein for brevity and clearness of description. However, it is to be understood that such words are used in connection with the positions shown in the drawings, and that the actual positions of the parts may vary when in use, etc.

According to this invention a comminuted material dispensing unit 20 is provided to receive the open end or mouth of a supply bottle 22, which may contain any comminuted material, such as "instant" coffee, and the like.

The dispensing unit may include the bottle engaging upper member 24 and the plunger and discharge lower member 26.

The lower member 26 is horizontally slidable with respect to the upper member 24 along the dovetail joints 28 for assembly purposes, and also for repair service, or cleaning purposes or the like. If desired, the members 24 and 26 after being properly assembled, may be locked together by any suitable means, such as by screws 30, or the like.

The lower member 26 may include a main disc-like member 32, which has a circumference 34 or outer wall 34. The disc-like member 32 has a platform 36, which is connected to the disc 32 by the dovetail flanges 38, which are to form the dovetail joints 28 and are to dovetail into the dovetail flanges 40 of the upper member 24, later to be described.

The platform 36 has a plunger receiving groove 42, which receives the dispensing plunger 44. The plunger 44 can be moved in and out of the groove 42 by the user to dispense a measured quantity of comminuted material from the bottle 22. The measured quantity, which may be equal to a teaspoonful, is discharged through opening or spout 46 into a receptacle, such as a coffee cup, a coffee pot, or any other receptacle placed under the spout 46 to receive the comminuted material being dispensed by this apparatus.

The dispensing plunger 44 may be of rectangular cross section if desired, and may have an arched or semi-circular wall 48 at one end and a finger receiving indentation 50 at the other end. The plunger 44 has a downwardly directed cavity 52 which receives the compression spring 54, which biases or returns the plunger 44 outwardly from the member 26. The user can push the plunger 44 inward by pressing the end 50 of the plunger, and the plunger is returned to its outward position by spring 54. One end of the spring 54 is received by the leftwardly open cup 56, which extends upwardly from the bottom wall 58 of the member 26. The other end of the spring 54 is received in the small rightwardly open cavity 60.

The plunger 44 also has a vertical cylindrical measuring opening 62 which is aligned with the opening or discharge outlet 64 of the upper member 24, when the plunger is in the outward or leftward position of FIGURE 1, and is aligned with the discharge opening or spout 46 of the member 26, when the plunger is pushed inward to its discharging position with the opening 62 over the spout 46. The measured comminuted material is thus received in measured quantity in the measuring opening or cavity 62 from the supply outlet 64 and is transferred to the dispensing spout 46 from which it is discharged in measured quantity into the receiving receptacle.

The upper member 24 has a cylindrical bottle mouth receiving wall 66 which has its inner surface threaded to receive the threads of the mouth of a supply bottle or container 22, for example. The threads of the bottle are the threads which receive the usual bottle cover which has been removed so the wall 66 of the member 24 may be secured to the mouth of the bottle.

The member 24 also has a bottom wall 68, which has a downwardly slanting surface 70, which may be in the form of a truncated inverted cone extending from the bottom of the wall 66 to the top of the opening 64. Therefore, the powdered coffee or the like from the bottle 22 is fed to the supply outlet 64 of member 24 and then directly into the cylindrical transfer opening 62 of the plunger 44, when the plunger 44 is in its leftward position of FIGURE 1, so that the cavity or cylindrical transfer opening 62 of the plunger is completely filled with the powdered coffee or other comminuted material.

When the plunger 44 is pushed rightwardly, to its full rightward position, the contents of the cavity or slot 62 are transferred from the position under the supply outlet 64 to a position over the spout and the discharge 46. At the same time the supply outlet 64 is closed by the upper wall 72 or upper surface 72 of the plunger 44.

A downwardly directed pair of tongues 74, FIGURES 3, 6 and 7, extend downwardly on each side of a dovetailing groove 75 at the bottom of the member 24, which tongues 74 may have inner dovetailing walls 40, which are adapted to dovetail with the walls 38 of the member 26 to form the dovetail joints 28.

In assembling the dispensing unit of FIGURES 1 to 13, the plunger 44 is placed in the groove 42 of the member 26, with the spring 54 in cavity 52. The spring 54 may be assembled so that one end of the spring is in the receiving cavity 56, and the other end of the spring 54 is in the receiving cavity 60. The member 26 is then interlocked with the member 24 by inserting the dovetailing flanges 38 of the member 26 into the dovetailing flanges 40 of the member 24. These members 24 and 26 may then be moved relatively to each other, until their outer cylindrical surfaces 34 and 67 are aligned, as in FIGURE 1. They may then be secured together, if desired, by some attaching means, such as screws 30, to hold the members 24 and 26 from relative movement with respect to each other.

When it is desired to attach the unit 20 to a bottle 22, the bottle 22 has its cover removed, while the bottle is held with its mouth upward. The unit 20 is then inverted, so that the cylindrical wall 66 is downwardly directed, and then the unit 20 may be threaded over the threads of the bottle 22, until the unit 20 and the bottle 22 are securely attached together.

When it is desired to dispense a measured quantity of instant coffee or the like, the bottle 22 and the unit 20 are held with the discharge opening or spout 46 directed downwardly. Then the plunger 44 is pushed inwardly until the cylindrical opening 62 of the plunger 44 is aligned with the discharge spout 46 of the member 26. A measured quantity of comminuted material which was held in the cavity 62 is then discharged downwardly through the spout 46 into the receiving receptacle which is held under the opening 46. If desired, several measured quantities may be dispensed, merely by allowing the plunger 44 to be returned outwardly by the spring 54, and then pushing the plunger 44 inward a second time. This operation may be repeated as often as desired, to provide any desired number of measured quantities of material.

If desired, a downward extension 76 may be provided on the member 26, so that an index finger, for example, may be placed around the member 76, while the plunger 44 is being pushed inwardly by the thumb.

FIGURES 14 to 16 show a dispensing unit 20A which is adapted to be placed on a vertical wall, so that the unit is held on such vertical wall for dispensing therefrom. The dispensing unit of these FIGURES 14–16 may include an upper member 24A and a lower member 26A substantially identical with the members 24 and 26 of the unit 20 heretofore described in connection with FIGURES 1 through 13. The members 24A ad 26A may be substantially the same in construction and operation as heretofore described in connection with members 24 and 26. However, the member 24A may be formed integrally with a flat wall attaching support member 78, which may have a pair of side flanges 80 and a floor 82 connecting the members 78 and 80 to the member 24A. A few of the members previously described are indicated in FIGURES 14 through 16 with the suffix A attached thereto merely to identify the corresponding parts. It is understood however that the operation of the member as shown in FIGURES 14 through 16 is essentially the same as that previously described in connection with the previous FIGURES 1–13.

The attaching member 78 may be provided with screw head engaging openings 84 which permit the unit 78, 20A to be engaged with and disengaged from screw heads on the wall which supports the unit.

The openings 84 are made in the flat plate 78 so that they are relatively large at their lower ends to permit the screw heads of the screws in the supporting wall to pass through said openings at said relatively large lower ends for detachment of the flat plate 78 from the supporting wall. The openings 84 are relatively small at their upper ends to receive said screws but to prevent said screw heads from passing through said openings at said upper ends so that said plate 78 is attached to said supporting wall.

The plate 78 is detached from the supporting wall by sliding the plate 78 upward so the plate 78 can then be pulled forward with the lower ends of openings 84 passing the screw heads. The plate 78 can be attached to the supporting wall by moving the plate 78 backwardly to pass the lower ends of the openings 84 past the screw heads and then sliding the plate 78 downwardly.

To attach a bottle 22A to the unit 20A, the unit 20A is disengaged from its supporting wall by disengaging the openings 84 from the screw heads. The unit 20A is then inverted and threaded over the open mouth of the bottle 22A which bottle is held with its mouth end up. After they have been secured together they may be placed on the wall for use.

The upper and lower members 24 and 26 may be made of any suitable material, such as of metal or plastic materials, as desired.

The assembled unit 20 and bottle 22 are shown in reduced scale and in inverted position, ready for dispensing the comminuted material in FIGURE 17. The assembled unit 20A and bottle 22A are also in inverted position, as in FIGURE 15, when in use.

FIGURE 18 shows another embodiment wherein the openings 64 of FIGURE 2 is changed into the shape of 64A, and the opening 46 is changed into the shape of 46A. An opening 62 A is shown, which corresponds to the opening 62 of plunger 50 but is shown in a partially pushed in position. The openings 64A and 46A are spaced sufficiently far apart, so that a continuously opened passageway cannot be formed between the bottle 22 and the discharge opening 46 by an accidental partial movement of the plunger 50 inward. It is to be seen that if the opening 62A is moved inward sufficiently, to partially connect with the opening 46A, as shown in dotted lines in FIGURE 18, then the opening 62A of the plunger 50 would not be aligned with the opening 64A of the wall 68. Therefore, there could never a continuous flow of powdered coffee or the like because of an accidental parallel pushing in of the plunger 50.

It is thus to be seen that a very desirable, useful dispensing unit has been provided.

While the form of the invention now preferred has been disclosed as required by statue, other forms may be used, all coming within the scope of the claimed subject matter which follows.

What is claimed is:

1. In combination: a comminuted material supply container receiving unit having a supply container receiving wall connected to a comminuted material supply outlet in said unit and having a comminuted material dispensing spout for dispensing measured comminuted material to a receiving receptacle and the like, and an outwardly biased plunger reciprocable between an outward position to an inward position and having a transfer measuring cavity aligned with said supply outlet when said plunger is in its outward position and being transferred into alignment with said spout when said plunger is pushed inward to its inward position, and in which said container receiving unit has an upper member having an upper cylindrical container receiving wall and a downwardly slanting floor connected at its upper edge to said container receiving wall and connected at its lower edge to said comminuted material supply outlet, said container receiving unit having a lower member detachably secured to said upper member, said lower member reciprocably receiving said plunger and having said dispensing spout, and in which said lower member is slidably dovetailed with said upper member.

2. In combination: a container receiving upper member having an upper internally threaded cylindrical container receiving wall and a bottom floor with a downwardly slanting funnel shaped floor surface connected at its upper edge to said container receiving wall and connected at its lower edge to a comminuted material central supply outlet; a lower member detachably connected to said bottom floor of said upper member, said lower member having a dispensing spout in a bottom wall of said lower member and having a horizontal plunger receiving channel above said bottom wall extending from one edge of said lower member centrally across said lower member above said bottom wall and above said dispensing spout; and an outwardly biased reciprocable plunger in said channel reciprocable between an outward position and an inward position, said plunger having a vertical measuring slot extending through said plunger and closed at its lower end by said bottom wall of said lower member and having its upper end connected to said central supply outlet when said plunger is in its outward position, said slot having its lower end connected to said spout and having its upper end closed by said bottom floor of said upper member when said plunger is in its inward position, and in which said plunger has a downwardly directed spring receiving cavity with a spring end receiving hole at one end, said bottom wall having a spring end receiving cup extending into said cavity; and a spring in said cavity with one end in said receiving hole and with its other end in said receiving cup, and in which said upper member is substantially vertical cylindrical member with its bottom floor having a downwardly directed dovetailing slot with parallel slanting downward dovetail flanges, and in which said lower member is a vertical cylindrical member with an upwardly directed dovetailing platform with parallel slanting upward dovetail flanges flanges engaging said downward dovetail flanges.

3. A combination according to claim 2 in which said plunger receiving channel extends along said platform between and parallel to said upward dovetail flanges.

4. In combination: a container receiving upper vertical member having an upper container receiving wall with an internal cylindrical threaded surface and a bottom floor with a downwardly slanting funnel shaped floor surface connected at its upper edge to said container receiving wall and connected at its lower edge to a comminuted material central supply outlet, said bottom floor having a downwardly directed dovetailing slot; a lower vertical member detachably connected to said bottom floor of said upper member, said lower member having an upwardly directed dovetailing platform dovetailed into said downwardly directed dovetailing slot and having a dispensing spout in a bottom wall of said lower vertical member and having a horizontal plunger receiving channel above said bottom wall along said platform and extending from one edge of said lower member centrally across said lower member above said bottom wall and above said dispensing spout; and an outwardly biased reciprocable plunger in said channel reciprocable between an outward position and an inward position, said plunger having a vertical measuring slot extending through said plunger and closed at its lower end by said bottom wall of said lower member and having its upper end connected to said central supply outlet when said plunger is in its outward position, said slot having its lower end connected to said spout and having its upper end closed by said bottom floor of said upper member when said plunger is in its inward position.

5. A combination according to claim 4 in which said upper vertical member and said lower vertical member have vertical aligned cylindrical outer surfaces.

6. A combination according to claim 4 in which said upper vertical member has a supporting wall attachable and detachable member for detachably securing said upper vertical member to said supporting wall to permit said upper member to be detached from said supporting wall and be inverted and attached to the open end of a comminuted material supply container and then to be returned and attached to said supporting wall for dispensing said comminuted material from said attached container.

7. A combination according to claim 6 in which said supporting wall attachable and detachable member includes a flat plate with screw head receiving openings slidable upwardly to detach said plate from screws in said supporting wall and slidable downwardly to attach said plate to said screws in said supporting wall.

8. A combination according to claim 7 in which said screw head receiving openings are relatively large at their lower ends to permit the screw heads of said screws to pass through said openings at said lower ends, said openings being relatively small at their upper ends to receive said screws but to prevent said screw heads from passing through said openings at said upper ends.

References Cited by the Examiner

UNITED STATES PATENTS

| | | | |
|---|---|---|---|
| 1,880,823 | 10/32 | Cooper | 222—336 |
| 1,904,756 | 4/33 | Wooster | 222—336 |
| 1,968,641 | 7/34 | Greig | 222—361 X |
| 2,537,415 | 1/51 | Loeb et al. | 222—361 |
| 2,553,509 | 5/51 | Altorfer | 222—361 |
| 2,683,554 | 7/54 | Mulhauser | 222—336 X |
| 2,710,118 | 6/55 | Stoddard | 222—361 X |

LOUIS J. DEMBO, *Primary Examiner.*